United States Patent [19]

Uejima

[11] Patent Number: 5,419,999
[45] Date of Patent: May 30, 1995

[54] OPTICAL RECORDING MEDIUM AND RECORDING/REPRODUCING METHOD THEREFOR

[75] Inventor: Atsushi Uejima, Kanagawa, Japan

[73] Assignee: Fuji Photo Film Co., Ltd., Kanagawa, Japan

[21] Appl. No.: 164,786

[22] Filed: Dec. 10, 1993

Related U.S. Application Data

[63] Continuation of Ser. No. 671,339, Mar. 19, 1991, abandoned.

[30] Foreign Application Priority Data

Mar. 27, 1990 [JP] Japan ................. 2-75680

[51] Int. Cl.[6] ............ G03C 1/72; G11B 7/26
[52] U.S. Cl. .................. 430/290; 430/270;
430/945; 430/346; 346/135.1; 369/283
[58] Field of Search ........... 430/270, 346, 945, 495,
430/321, 290; 428/64, 65; 346/135.1; 369/283, 286, 288

[56] References Cited

U.S. PATENT DOCUMENTS

| 4,090,031 | 5/1978 | Russell | 369/108 |
|---|---|---|---|
| 4,219,704 | 8/1980 | Russell | 369/108 |
| 4,451,914 | 5/1984 | LaBudde et al. | 430/945 |
| 4,460,636 | 7/1984 | Watanabe | 430/945 |
| 4,547,444 | 10/1985 | Bell et al. | 430/945 |
| 4,568,952 | 2/1986 | Gittleman et al. | 430/945 |
| 4,584,259 | 4/1986 | Mayer et al. | 428/64 |
| 4,651,172 | 3/1987 | Watanabe et al. | 430/495 |
| 4,718,053 | 1/1988 | Sato et al. | 369/286 |
| 4,860,273 | 8/1989 | Sawano et al. | 369/100 |
| 4,940,618 | 7/1990 | Hamada et al. | 430/945 |
| 4,973,572 | 11/1990 | DeBoer | 430/945 |
| 5,075,147 | 12/1990 | Usami et al. | 430/945 |
| 5,124,232 | 6/1992 | Nakanishi et al. | 430/270 |

FOREIGN PATENT DOCUMENTS

| 56-74843 | 6/1981 | Japan . | |
| 62-222442 | 9/1987 | Japan | 428/64 |
| 63-98854 | 4/1988 | Japan | 428/64 |
| 63-142546 | 6/1988 | Japan . | |
| 1-149245 | 6/1989 | Japan . | |
| 1291987 | 10/1989 | Japan | 430/945 |

OTHER PUBLICATIONS

CRC Handbook of Chemistry & Physics (1982–1983) p. C-783.
Wescon Technical Papers vol. 12, 1968 (1–6) Carlson & Ives.

*Primary Examiner*—Charles L. Bowers, Jr.
*Assistant Examiner*—Martin Angebranndt
*Attorney, Agent, or Firm*—Sughrue, Mion, Zinn, Macpeak & Seas

[57] ABSTRACT

An optical recording medium and a recording method therefor in which a recording layer group and a light-absorbing and heat-generating layer for absorbing radiated light to convert the absorbed light into heat are formed on a substrate. The recording layer group is formed of thermo-sensitive recording layers capable of recording thereon information in the form of a light signal stacked alternatingly with heat insulating layers. Laser light emitted from a luminous source in a recording apparatus is condensed through an objective lens so as to be focused on the light-absorbing and heat-generating layer, so that when heat of a predetermined quantity or more is generated by the light-absorbing and heat-generating layer, the heat reaches the recording layers successively stepwise due to the heat insulating functions of the respective heat insulating layers.

11 Claims, 1 Drawing Sheet

OPTICAL RECORDING MEDIUM AND RECORDING/REPRODUCING METHOD THEREFOR

This is a continuation of application Ser. No. 07/671,339, filed Mar. 19, 1991, now abandoned.

BACKGROUND OF THE INVENTION

The present invention generally relates to an optical recording/reproducing method for recording/reproducing an image, audio information, or the like in accordance with optical information, and particularly relates to an optical recording medium and a recording/reproducing method making it possible to perform high density recording/reproducing.

Conventionally, optical disks such as an audio compact disk (CD), a video disk (VD), and the like, on which recording/-reproducing of optical information can be performed have been very widely used.

Although there are certain problems with conventional disk, however. For example, a required disk-drive control system is complicated and expensive, optical disks are widely because they are superior to conventional recording media in many regards. For example, an optical disk recording can be made with much greater density, one or two orders of magnitude, than a magnetic recording because the signal is recorded/reproduced using a small light spot having a size of about the wavelength of light. Also, an optical disk has a signal surface which is not worn during use so that it is superior in non-volatility of recording (holding of recorded data) because the reproduction of the recorded information is performed by a noncontact method using a light beam.

In conventional optical disks, the signal is recorded as a series of binary values indicated by whether a hole (pit) exists or not in a light reflection surface of the disk, and information is expressed by a pit length (size) and a pit interval. There are two recording types, one being an analog recording such as laser vision or the like in which the pit length and pit interval vary continuously, the other being digital recording such as a digital compact disk or the like in which the pit length and pit interval discretely vary. In analog recording, generally, although any signal can be recorded so as to obtain an extremely high information packing density, there is a problem concerning the accuracy of the recorded signal and the accuracy of signal reproduction whereby noise in optical and electric systems directly affects the signal-to-noise ratio of the reproduced signal.

In digital recording, on the other hand, the recorded information can be accurately reproduced if the mark length can be discriminated. Further, digital recording has the advantage that even if a certain amount of error exists, the original correct information can be restored using an error correcting code. In digital recording, however, since the mark size must be discretely distributed within a predetermined range of length as described above, the number of marks is unavoidably limited, and it is therefore a matter of course that the recording density is limited.

As described above, in the case of a binary signal formed by a series of pits, a recording method in which the pit size, pit interval, and track interval are made small to thereby improve the recording density has been used conventionally. In making high the recording density, and correspondingly the processing speed, however, there has been a limit to the achievable recording density, even if the size of a recording signal is made as small as absolutely possible, due to the binary nature of the signal and in that a large number of bits (a large number of combinations of pits) is required in order to express complicated information.

In view of this situation, a method using a multi-valued recording signal (multi-recording) has been proposed in order to further improve the recording density. With respect to this method, a photochemical hole burning method (PHB) is considered to be promising. This method is, however, very difficult to be put to practical use at present because it is necessary to very precisely control the temperature of the recording apparatus.

Also, for example as disclosed in Japanese Patent Unexamined Publication No. Hei-1-319134, there has been proposed a method in which the mark diameter is changed by changing the quantity of light (the quantity of energy) of the recording laser light to thereby record a multi-valued signal on the basis of the light reflection factor corresponding to the value of the mark diameter.

In this method, however, the changes in the recording signal are difficult to distinguish from the case where the signal changes in a continuous manner. The method is therefore not significantly different from the previously described conventional techniques. More specifically, multi-valuing is carried out using a plurality of threshold values of the quantity of recording light as determined by changes in the recording spot diameter. However, the output power level of the recording signal beam generating laser generally unavoidably fluctuates in a range of about 1 to 2 mW, so that an error is caused in the recorded mark diameter. Since as the number of available multi-level values is increased the intervals of the threshold values become less, at a certain number of multi-value levels the fluctuations in the recording beam power level make it impossible to accurately distinguish between adjacent recorded levels.

SUMMARY OF THE INVENTION

An object of the present invention is to solve the foregoing problems in the prior art and to provide an optical recording medium and a recording/reproducing method in which a signal, which can be multi-valued, can be very accurately written and read out.

The foregoing and other objects of the present invention can be attained by an optical recording medium characterized in that a recording layer group and a light-absorbing and heat-generating layer for absorbing radiated light to convert the absorbed light into heat are formed on a substrate, the recording layer group being formed of thermo-sensitive recording layers capable of recording therein information in the form of a light signal and heat insulating layers, the thermo-sensitive recording layers and the heat insulating layers being alternately stacked one-on-one in three or more layers, and the light-absorbing and heat-generating layer being formed in a position so as to contact the recording layer group.

The foregoing object of the present invention can also be attained by a method using the foregoing recording medium, that is, by a method of recording/reproducing optical information in which a light-absorbing and heat-generating layer for absorbing specified light to convert the absorbed light into heat is irradiated with laser light focused on the light-absorbing and heat-generating layer, and in which, by use of a recording layer group disposed adjacent to the light-absorbing and heat-generating layer and formed of thermo-sensitive recording layers and heat insulating layers alternately stacked one on one in layers, a multi-valued signal pattern is recorded based on stepwise concentration changes of the thermo-sensitive recording layers due to modulation of the laser light.

DESCRIPTION OF THE PREFERRED EMBODIMENTS

Preferred embodiments of the present invention will be described hereunder with reference to the accompanying drawings. The present invention, however, is limited only to these embodiments.

Figure 1:
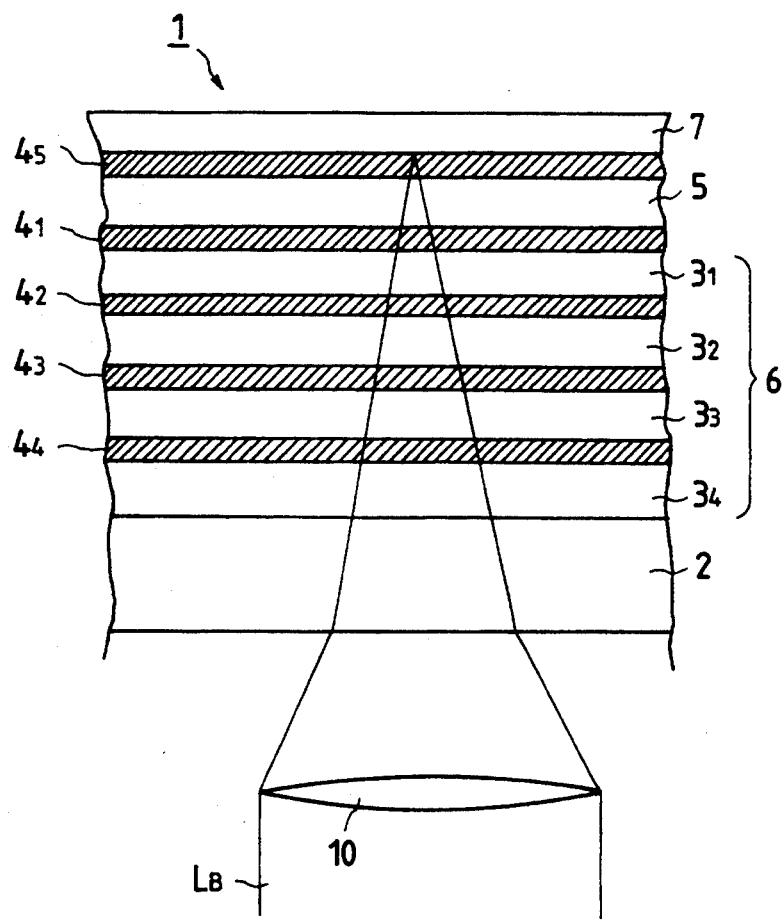
FIG. 1 is a partial sectional view showing a preferred embodiment of an optical recording medium according to the present invention.

FIG. 1 is a partial sectional view showing an optical disk, which is an optical recording medium according to the present invention. In an optical disk 1, thermal-sensitive recording layers $3_n$ and heat insulating layers $4_n$ are alternately stacked one-on-one in plural layers so as to form a signal recording layer group 6 on a transparent substrate 2.

In this embodiment, the recording layer group 6 is constituted by four recording layers $3_n$ ($3_1$, $3_2$, $3_3$, and $3_4$) and four heat insulating layers $4_n$ ($4_1$, $4_2$, $4_3$, and $4_4$). A light-absorbing and heat-generating layer 5 for absorbing radiated light to convert the absorbed light into heat is formed on the recording layer group 6, and a flat reflection layer 7 made, for example, of aluminum, gold, silver, or the like is formed on the light-absorbing heat-generating layer 5 through the heat insulating layer 45. The reflection layer 7 is formed by an evaporation method, a sputtering method, or the like.

Each thermal-sensitive recording layer $3_n$ has the same composition is the others and may be formed, for example, of a phase-change material such as InSe or an imidazoquinoxaline-type coloring material so that the layer is colored by application of heat. In the recording layer group 6, each heat insulating layer $4_n$ is disposed between two thermal-sensitive recording layers $3_n$ and has the function of suitably controlling heat transmission between the thermal-sensitive recording layers $3_n$. Each heat insulating layer $4_n$ may be formed, for example, of a high molecular weight material such as silicon dioxide ($SiO_2$), polytetrafluoroethylene (Teflon®), or the like. Further, each heat insulating layer $4_n$ is transparent.

The light-absorbing heat-generating layer 5 has a different composition than the recording layers and may be formed, for example, of a cyamine dye or the like so as to effectively generate heat by light illuminated onto the layer.

Description will be made as to a signal recording method using the recording medium having a configuration as described above.

Figure 2:
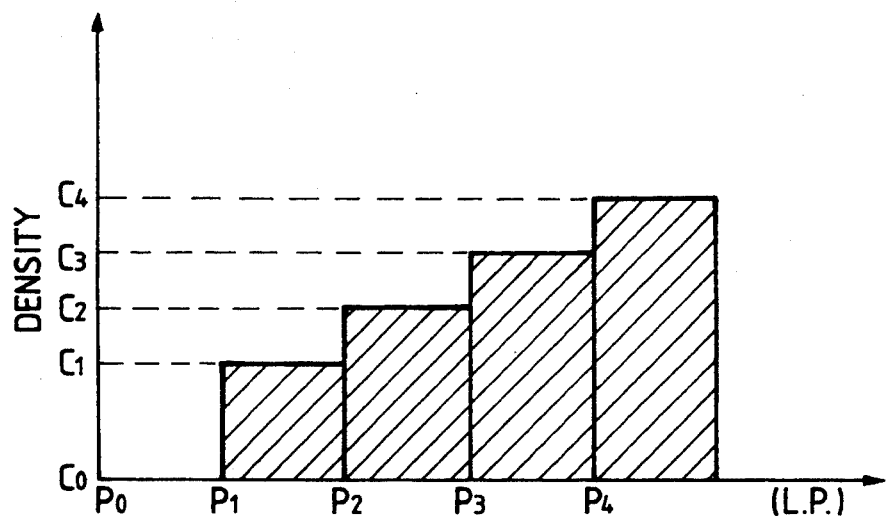
FIG. 2 is a graph showing the relation between the number of recording layers and changes of concentration of a signal.

Laser light $L_B$ emitted from a luminous source of a recording apparatus is condensed through an objective lens 10 so as to be focused on the light-absorbing and heat-generating layer 5. As a result, the light-absorbing and heat-generating layer 5 absorbs the light and generates heat. Then, when the quantity of the generated heat reaches a predetermined value or more, the heat reaches the first recording layer $3_1$, overcoming the heat insulating ability of the first heat insulating layer $4_1$. As a result, although the first recording layer $3_1$ is colored, the second recording layer $3_2$ adjacent thereto is not colored because of the heat insulating function of the second heat insulating layer $3_2$. Since the heat insulating ability of each of the heat insulating layers permits a change of the quantity of heat generation due to fluctuations of the output of the laser light $L_B$, the writing accuracy of the recorded signal is made extremely high due to the lack of any effect caused by fluctuations of the laser power. That is, it is possible to prevent generation of defective recording caused by fluctuations in the laser light output because the width of the laser power (LP) from the first critical point to the second critical point is very large in comparison with the magnitude of the fluctuations in the output of the writing laser beam, as indicated in FIG. 2. A signal corresponding to a first concentration level $C_1$ in FIG. 2 can be written by maintaining the laser power $P_n$ in the range of $P_1 \leq P_n < P_2$, as described above.

In order to establish the second concentration level $C_2$, it suffices to make the quantity of light intensive by modulating the laser light $L_B$ or to prolong the time of radiation of the laser light $L_B$ to thereby make the heat reach the second recording layer $3_2$. In this manner, by adjusting the quantity of light as described above (the same applies to the other points $P_2$, $P_3$, and $P_4$), the third and fourth recording layers $3_3$ and $3_4$ can be successively colored. Thus, it is possible to perform writing in the state where the concentration levels are clearly separated into five stages from $C_0$ to $C_4$.

Thus, laser light is directed onto the light-absorbing and heat-generating layer 5 to cause the layer 5 to absorb the laser light $L_B$ and convert the absorbed light into heat, and the thermo-sensitive recording layers $3_n$ and the heat insulating layers $4_n$ are alternately stacked one-by-one in plural layers adjacent to the light-absorbing and heat-generating layer 5, as described above. Accordingly, when the heat generated in the light-absorbing and heat-generating layer 5 is transmitted in the direction of the thickness of the recording layer group 6, the heat insulating functions of the respective heat insulating layers 4, can clearly discriminate changes of heat between the recording layers, that is, the respective heat insulating layers act as threshold values, which do not cause misidentification of signals. Consequently, recording and reproducing can be performed to obtain a very clear signal on the basis of a multi-valued signal pattern by discrete changes in concentration in the recording layer group 6 utilizing changes in the number of recording layers. This is accomplished without changing the size of the recording mark.

In the reproducing operation, on the other hand, the reflection layer 7 is irradiated with the reading laser light, and a read-out signal is produced on the basis of the quantity of the reflected light. In this case, as easily seen also from FIG. 2, the signal can be reproduced as the stepwise discrete signals ($C_0$, $C_1$, $C_2$, $C_3$, and $C_4$). Therefore, slight fluctuations of the laser light output during the recording operation will not affect the quality of the recorded signal. Accordingly, not only is the discrimination of the signal good so as to make the recording reliability high, but it is also possible to accurately reproduce the stored information even if the accuracy of a reproducing apparatus is not particularly high.

According to the present invention, the coloring of the recording layers $3_n$ is not limited to colors within the visible spectrum, but it is a matter of course that wavelengths other than those within the visible spectrum be used. That is, the coloring is not specifically limited. This is because, for example, a layer change in a recording layer which easily absorbs laser light in the reproducing operation can be regarded as coloring. Thus, it is possible to produce an effective difference in concentration by changing the substance of the recording layer so that it can easily absorb wavelengths equal to or approximate to that of the laser light used for reproducing.

The heat insulating layer 4 may also function to prevent heat generated in the light-absorbing and heat-generating layer 5 from escaping to the side of the reflection layer 7.

Although the light-absorbing and heat-generating layer 5 is disposed in opposition to the substrate 2 with the recording layer group 6 therebetween in this embodiment, the present invention is not limited to this arrangement, and, for example, the configuration may be such that the light-absorbing and heat-generating layer 5 is disposed so as to be closer to the substrate than the recording layers $3_n$, or disposed inside of the recording layer group 6.

Although a five-valued signal is used in this embodiment, it is a matter of course that more than five levels can be used. A three-valued signal can be obtained in the case of providing two recording layers; generally, when an N-valued signal is required, it suffices to provide $(N-1)$ recording layers.

The recording medium according to the present invention is not limited to that for exclusive use for reproducing, but it is a matter of course that the recording medium can be a write-once type.

Further, although the recording medium in this embodiment has a configuration in which the reflection layer 7 is provided, the present invention is not limited to this arrangement. That is, the reflection layer 7 may be eliminated if desired. For example, the recording medium may have a configuration in which the recording layer group 6 is sandwiched between light-permissible supports (substrates), and a recording signal is detected by detecting the quantity of light of the light transmitted through the recording layer group 6, so that it is possible to exceedingly accurately obtain a reproduced signal.

According to the present invention, there is provided an optical recording medium in which a recording layer group and a light-absorbing and heat-generating layer for absorbing radiated light to convert the absorbed light into heat are formed on a substrate. The recording layer group is formed of thermo-sensitive recording layers capable of recording thereon information in the form of a light signal and heat insulating layers. The thermo-sensitive recording layers and the heat insulating layers being alternately stacked in plural layers, the light-absorbing and heat-generating layer being formed in a position so as to contact the recording layer group. Accordingly, for example, laser light emitted from a luminous source in a recording apparatus is condensed through an objective lens so as to be focused on the light-absorbing and heat-generating layer, so that when heat of a predetermined quantity or more is generated by the light-absorbing and heat-generating layer, the heat reaches the recording layers successively stepwise due to the heat insulating functions of the respective heat insulating layers. As a result, a multi-valued signal can be digitally expressed. When heat generated by absorption of laser light is transmitted in the direction of the thickness of the recording layer group as described above, the heat insulating functions of the respective heat insulating layers make it possible to clearly discriminate changes of the transmitted heat in every recording layer. Therefore, without changing the size of the recording mark as in the conventional optical recording medium, a very clear signal can be recorded in the form of a signal pattern on the basis of a stepwise change of concentration in the recording layer group utilizing a change of the number of recorded layers, that is, a change in the mark depth direction, and the thus-recorded signal can be reads as a signal having a stepwise clear concentration difference.

As described above, in the recording medium and recording/reproducing method according to the present invention, an exceedingly large number of signal patterns can be recorded/reproduced as stepwise discrete signals, and therefore not only is the reliability of the signal improved, but also slight changes in the laser light output during the recording operation can readily be easily tolerated. Further, it is possible to accurately reproduce the recorded information even if the accuracy of the reproducing apparatus is not great.

What is claimed is:

1. A method for recording optical information, comprising the steps of:

providing an optical recording medium comprising a light-absorbing and heat-generating layer for absorbing light to convert absorbed light into heat, and a recording layer group layer disposed adjacent said light-absorbing and heat-generating layer, said recording layer group layer comprising a plurality of alternatingly stacked thermo-sensitive recording layers and heat-insulating layers, said thermo-sensitive recording layers all having the same composition, and said light-absorbing and heat-generating layer having a different composition than said recording layers; and radiating and focusing laser light from a single laser light source on said light-absorbing and heat-generating layer while modulating the recording energy of said laser light in accordance with a multi-valued signal to record said multi-valued signal on said optical recording medium in the form of phase changes of said thermo-sensitive recording layers, wherein a number of said thermo-sensitive recording layers whose phase is changed by said laser light varies stepwise in accordance with said recording energy of said laser light and with the corresponding value of said multi-valued signal.

2. The method for recording optical information of claim 1, wherein said step of providing said optical recording medium further comprises providing a light-reflecting layer adjacent said light-absorbing and heat-generating layer.

3. The method for recording optical information of claim 1, wherein said thermo-sensitive recording layers are formed of InSe.

4. The method for recording optical information of claim 1, wherein said thermo-sensitive recording layers are formed of an imidazoquinoxaline-type coloring material.

5. The method for recording optical information of claim 1, wherein said heat-insulating layers are formed of a high molecular weight material.

6. The method for recording optical information of claim 5, wherein said high molecular weight material is Teflon.

7. The method for recording optical information of claim 1, wherein said heat-insulating layers are formed of $SiO_2$.

8. The method for recording optical information of claim 1, wherein said heat-insulating layers are formed of a material which is transparent to the wavelength of said laser light.

9. The method for recording optical information of claim 1, wherein said light-absorbing heat-generating layer is formed of a cyanine dye.

10. The method for recording optical information of claim 1, wherein said step of modulating the recording energy of said laser light comprises varying a power of said laser light.

11. The method for recording optical information of claim 1, wherein said step of modulating the recording energy of said laser light comprises varying a recording time of said laser light on said optical recording medium.

* * * * *